Oct. 18, 1966  E. B. KRAUSE  3,279,695
POSITION COMPUTER
Filed July 6, 1964  2 Sheets-Sheet 1
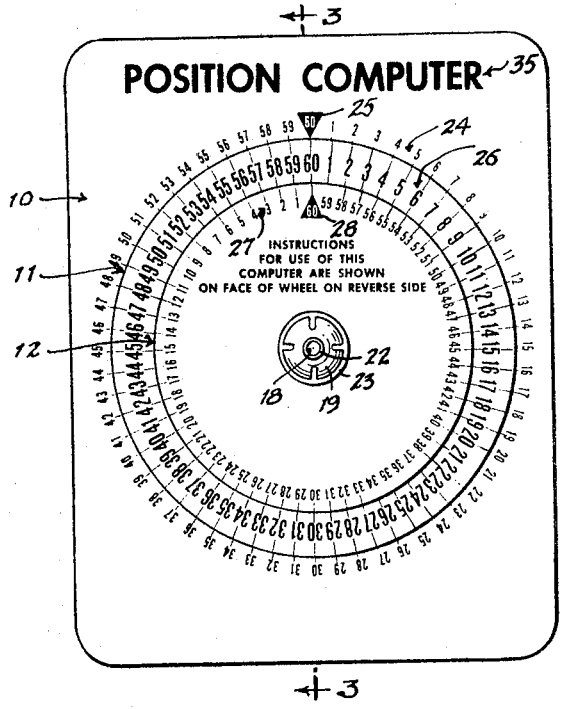
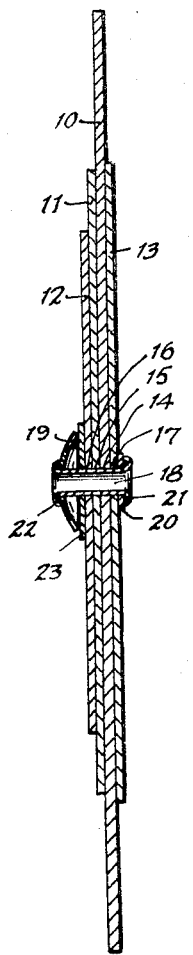
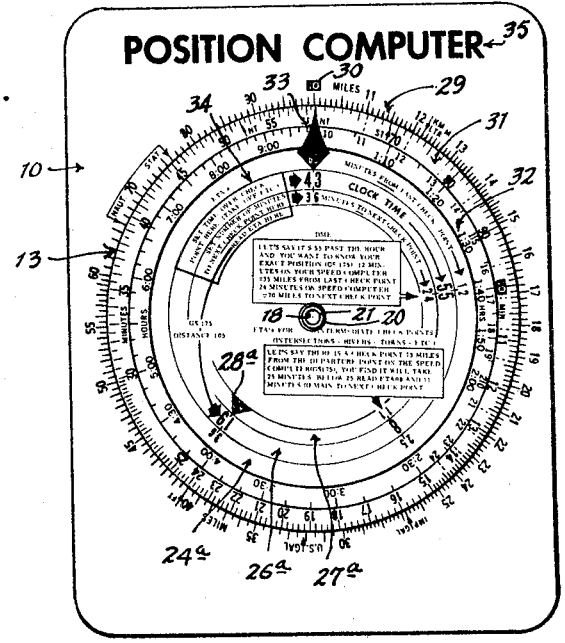
INVENTOR.
EDWARD B. KRAUSE
BY
*James Mattern.*
ATTORNEY.

Oct. 18, 1966     E. B. KRAUSE     3,279,695

POSITION COMPUTER

Filed July 6, 1964     2 Sheets-Sheet 2

INVENTOR.
EDWARD B. KRAUSE
BY
ATTORNEY.

United States Patent Office 3,279,695
Patented Oct. 18, 1966

3,279,695
POSITION COMPUTER
Edward B. Krause, Trumbull, Conn., assignor of one-half to Clarence W. White, Stratford, Conn.
Filed July 6, 1964, Ser. No. 380,475
5 Claims. (Cl. 235—78)

The present invention relates to a position computer for use by aircraft pilots while in flight, and more particularly an improved position computer especially adapted for use in conjunction with a speed computer.

Pilots while en route from point to point have to report the time over a given point and give an estimate of their arrival time over the next check point, and air traffic controllers follow a similar procedure while checking the traffic they are handling. The usual procedure is to employ a speed computer to determine how many minutes it will take to cover a known distance at a known or estimated ground speed. With this information at hand the pilot is required to calculate the time of arrival at a destination point, the time of arrival over intermediate check points, and the travel time between such points, using the actual time shown on a clock at the point of departure as a reference from which the time of arrival over or at other points is determined.

Heretofore this has involved the transposition of time arrived at on the speed computer, i.e., minutes to travel a given distance at a given speed, to actual clock time, i.e., the relation of such given number of minutes to the instant time shown on a clock. This is an addition and subtraction problem which has usually been solved by mental or pencil arithmetic, and while the problem itself is not a difficult one it has to be done in the midst of other important and distracting duties. As a result this simple problem becomes difficult and erroneous answers are often arrived at. Such erroneous answers are of major concern to pilots and air traffic controllers as they set up the possibility of a mid-air collision. E.T.A. or Estimated Time of Arrival reports are given on an average of about every 12 minutes while in flight. If it is assumed that 2,000 aircraft are in flight in the continental United States at any given hour of the day there are approximately 10,000 such reports that must be calculated by pilots and transmitted to traffic controllers every hour of the day and every day of the year. The quick, easy and positive determination of E.T.A. made possible by the computer of the invention not only eliminates the possibility of error but gives the pilot more time to devote to other duties in the operation of his aircraft. Accurate reports quickly arrived at also greatly reduce the radio communications traffic on already overworked frequencies.

It is an object of the invention to provide a position computer which will enable the pilot to accurately record the clock time of departure as a reference point and, given the air speed for covering a given distance as shown by a speed computer used in conjunction with the position computer, the pilot may accurately set the position computer to show the estimated clock time of arrival at his point of destination, time of arrival over intermediate check points, and travel times completed or contemplated between given points.

Another object is to provide a position computer having integrated obverse and reverse sides, one side having speed computer dial means and the other side having position computer dial means. It is further proposed to provide instruction means in direct association with the speed computer dial means graphically explaining the manner of operating the position computer dial for a hypothetical set of facts, with all number characters except those used in the explanation example omitted, thus greatly facilitating the understanding of the function and operation of the position computer.

A further object is to provide a position computer of rotary slide-rule type having a plurality of relatively rotatable dials and including a rectangular base or fixed member by means of which an index mark on said fixed member may be oriented with facility through its reference to the rectangular shape of said base, thus making it possible by simply picking up the computer to determine its proper operating position.

Another object is to provide a compact pocket-size position computer which by virtue of its rectangular outline shape will not rotate when placed in a pocket or set up on one edge, thus maintaining the computer in a properly oriented position for ready reference.

Other objects and advantages will become apparent from a consideration of the following detailed description taken in connection with the accompanying drawings wherein a satisfactory embodiment of the invention is shown. However, it will be understood that the invention is not limited to the details disclosed but includes all such variations and modifications as fall within the spirit of the invention and the scope of the appended claims.

In the drawings:

FIG. 1 is a plan view of the obverse side of a position computer according to the invention, the relatively rotatable dial means being shown set in a zero position;

FIG. 2 is a plan view of the reverse side of the position computer showing the relatively rotatable dial means in a zero position;

FIG. 3 is a sectional view on an enlarged scale taken along the line 3—3 of FIG. 1;

Figure 4:
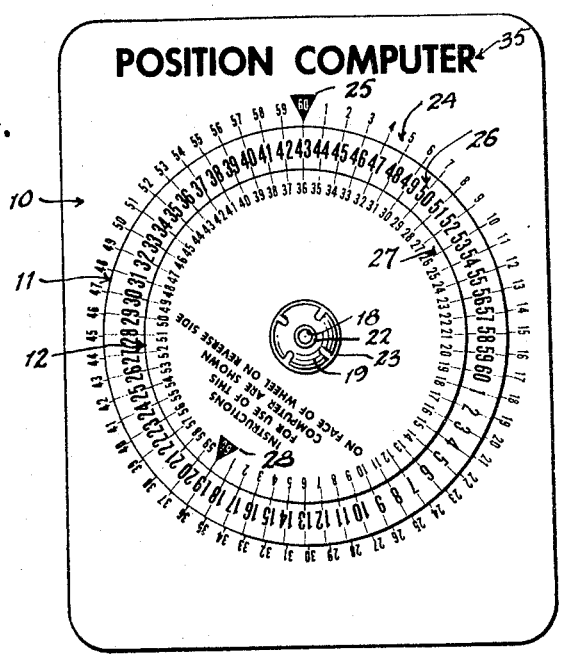
FIG. 4 is a plan view of the obverse side of the position computer showing the dial means in an adjusted position for solving a particular position problem.

Referring to the drawings and more particularly to FIGS. 1-3, the position computer according to the exemplary embodiment of the invention illustrated therein comprises a base member 10 of rectangular outline formed of suitable sheet material, for example vinyl sheet of suitable thickness and stiffness to withstand handling and manipulation, there being rotatably mounted upon the obverse side in substantially centralized and concentric relation a circular dial 11 and a circular dial 12 of smaller diameter than the dial 11, the latter being disposed intermediate the base member 10 and the dial 12. Upon the reverse side there is rotatably mounted a circular dial 13. The base member 10 and the dials 11, 12 and 13 are respectively provided with center holes 14, 15, 16 and 17 in register with each other and engaged by a grommet 18 upon which a dome shaped spring member 19 is disposed to exert frictional pressure upon the dials, to normally maintain them in a set position while permitting relative rotation independently of each other through manual rotative force applied thereto. A wear washer 20 is interposed between one curled end 21 of the grommet and the dial 13, the other curled end 22 of the grommet being engaged with the convex side of the spring member 19 with a wear washer 23 interposed between the spring member and the dial 12. The dials 11, 12 and 13 are preferably formed of the same type of sheet material as the base member 10, for example vinyl sheet, but are preferably of thinner gauge for the sake of compactness. The wear washers 21 and 23 are preferably formed of nylon.

The base member 10 is provided at its obverse side as seen in FIG. 1 in concentric surrounding relation to the periphery of the dial 11 with a scale 24 comprising evenly spaced numbers 1 to 60, and calibration markings radially aligned with the numbers. These numbers are arranged in clockwise order about the full circumference and represent the 60 minutes of an hour, the number 60 being at the top position and contained within an index mark 25 having its point end directed to the periphery of the dial 11.

Upon the visible margin of the dial 11 there is provided a scale 26 comprising evenly spaced numbers 1 to 60, and calibration markings radially aligned with the numbers, these numbers also being arranged in clockwise order and extending about the full circumference of the margin, and being preferably printed in larger and bolder type than the scale 24 for convenience in clearly distinguishing them during the setting and reading of the computer, as will presently more fully appear. The dial 12 is provided with a scale 27 comprising evenly spaced numerals 1 to 60, and calibration markings radially aligned with the numbers, these numbers being arranged in counter-clockwise order and extending about the full circumference of the margin of tne dial, with the number 60 contained within an index mark 28 having its point end directed toward the periphery of the dial 12.

The clockwise number scale 26 upon the dial 11 represented clock time, i.e., the current or present time to which the computer is to be set as a reference, the clockwise number scale 24 upon the base member 10 represents addition numbers, and the counter-clockwise number scale 27 upon the dial 12 represents subtraction numbers, as will hereinafter more fully appear.

Upon the reverse side of the computer the base member 10 is provided in concentric surrounding relation to the periphery of the dial 13 with a scale 29 representing miles, with the index number 10 at the top and contained within an index block 30. Less than 100 miles is read to the left of the index number 10 and more than 100 miles is read to the right, for example, the number 90 to the left reads 90 miles, and the number 11 to the right reads 111 miles. Upon the margin portion of the dial 13 there are provided an outer and inner concentric scale bands 31 and 32 respectively representing minutes and hours, with the number 60 contained within a double pointed index mark 33 having its outer point end directed outwardly to the calibrations of the scale 29 and its inner point end directed inwardly within the inner outline of the band 32. This index mark, in addition to its function in relation to the scale 29, in part provides a simulation or replica of the index mark 25 of the position computer means provided upon the obverse side of the computer. The scale 29 and the scales 31 and 32 upon the dial constitute a logarithmic speed computer of conventional type well known in the art. Its function and operation are well understood so that a detail description thereof is not deemed necessary.

Within the circular area 34 of the dial 13 defined by the inner scale 32 there is shown a skeletonized reproduction of the scale 24 of the base member 10 and the scales 26 and 27 of the two dials 11 and 12 of the position computer in a set position representing an example of a hypothetical set of facts, with identifying instruction data associated therewith and with all scale numbers omitted except those concerned with the hypothetical set of facts. The selected numbers of the respective scales 24, 26 and 27 are shown in concentric circular bands 24a, 26a and 27a with the inwardly directed point end of the index mark 33 containing the number "60" representing the index mark 25 of the scale 24 and an index mark 28a containing the number "60" representing the index mark 28 of the scale 27.

The rectangular outline shape of the base member 10 with its short sides at the top and bottom greatly facilitates the proper orientation of the devices for use. Additionally, the designation "Position Computer" is printed as at 35 in large bold type at both sides of the base member 10 along the top edge, so that at a glance the device can be positioned with its top edge uppermost. The rectangular shape also facilitates its convenient carrying in a pocket and enables it to be supported at its lower edge in an upright position upon a suitable supporting surface in ready view of the pilot.

The operation of the position computer of the invention is best explained by referring to the instruction data contained in the area 34 of the dial 13, using the hypothetical fact situation set forth therein as an example. The computer accomplishes three principal functions, as follows:

(1) E.T.A. function.—This refers to Estimated Time of Arrival at a given destination point.

(2) D.M.E. function.—This refers to the function of "Distance Measuring Equipment." Most commercial aircraft are provided with radio equipment, known as D.M.E. in communication with so-called V.O.R. stations, i.e., "Vision-Omni-Range" stations which upon being tuned in give a pilot his location with reference to a given point. The use of the term D.M.E. function in connection with the position computer of the invention refers to its function of obtaining the same type of information upon the computer in relation to a given starting point as is given through radio communication by the use of D.M.E. and V.O.R. stations.

(3) E.T.A. for Intermediate Check Points.—This refers to points of interest to be reported, for example, route intersections, radio fixes, rivers, towns, etc.

The procedure in connection with the E.T.A. function, predicated upon three factors, namely, the time of departure, the ground speed of the aircraft, and the distance to be travelled between the point of departure and the point of destination, is as follows. For example, it is assumed that the time of departure is 43 minutes past the hour, the ground speed of the aircraft is 175 m.p.h. (or knots), and the distance to be travelled is 105 miles, either statute or nautical miles. With this information at hand the pilot sets the speed computer dial 13 at 175, i.e., the index mark 33 is set half-way between the number 17 and 18 on the scale 29. Under the 105 mile marking on scale 29, which is the marking directly under the word "MILES" in FIG. 5, the number of minutes to travel the 105 miles at 175 m.p.h. is read as 36. The time of departure being 43 minutes past the hour the clock time scale on the dial 11 is rotated to bring the number 43 in line with the index marking 25 and the dial 12 is rotated to bring the number 36 of the scale 27 into line with the number 43 on the dial 11. This setting is shown in FIG. 4, and is similarly shown in FIG. 5 of the instruction data wherein the index mark 33 of the band 24a is in line with the number 43 of the clock time band 26a and the number 36 of the band 27a. Opposite the index mark 28 of the dial 12 the E.T.A. is shown as 19, and is similarly shown as 19 on the instruction data opposite the index mark 28a. This indicates that the estimated time of arrival at point of destination is 19 minutes past the hour. It will be noted that the number 36 on the scale 24 indicating the time en route appears opposite the number 19 on the scale 26, in other words, at any given setting of the computer the same number appears on the scale 27 opposite the index marking 25 of the scale 24 and on the scale 24 opposite the index marking 28 of the scale 27.

The D.M.E. function is accomplished as follows. At some time en route between the point of departure and the destination point the pilot may wish to know his exact position. This is accomplished by simply looking at the clock and arriving at the present time which is assumed to be 55 minutes past the hour. On the large bold numbers of the scale 26 of the dial 11 the pilot reads opposite the number 55 the number 12 on the scale 24 indicating the elapsed time from the departure point, and opposite 55 on the scale 27 the pilot reads 24 which is the time remaining to the destination point. On the speed computer scale opposite 12 minutes on the scale band 31 of the dial 13 he reads 35 miles, which are the miles covered from the departure point. Opposite the number 24 on the scale band 31 he reads 70 miles on the scale 29 which are the miles remaining to the destination point. This gives the pilot his present position, the minutes and miles from the departure point and the minutes and miles remaining to the destination point. Based on the accuracy of the ground speed estimate the pilot also knows the exact geographical position.

Figure 5:
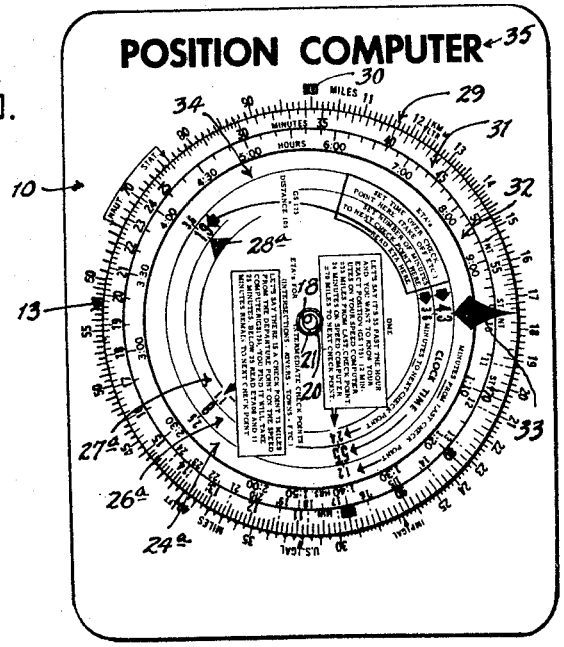
FIG. 5 is a plan view of the reverse side of the position computer with the speed computer means in an adjusted position integrated with the adjusted position of the position computer as seen in FIG. 4.

The E.T.A. for intermediate check points function is accomplished as follows. Assuming that there is a point of interest, for example, a river, town, or the like, or a point at which a position report must be transmitted and that the pilot's information gives this as 73 miles from the departure point. On the speed computer set for the estimated ground speed of 175 m.p.h. the time required to cover 73 miles is shown as 25 minutes. This is shown in FIG. 5 by the 73 mile marking on the scale 29 opposite the 25 minute marking on the scale 31. In order to arrive at an intermediate E.T.A. the pilot simply reads the time required to arrive over this E.T.A., i.e., 25 on the scale 24, and directly below 25 on the clock time scale 26 he reads 08 which is the E.T.A. at the 73 mile intermediate check point. Below 08 on the scale 27 of the dial 12 he reads 11 minutes which are the minutes remaining from the 73 mile intermediate check point to the final destination.

As above pointed out, the instruction data printed upon the area 34 of the dial 13 corresponds to the examples above given with all members except those concerned with the particular hypothetical calculations being omitted. This greatly facilitates an understanding of the operation and the functions of the position computer.

What is claimed is:

1. A computer for the solution of aircraft position problems, comprising a planar base member constituting a fixed reference, a first circular dial rotatably superimposed in parallel relation upon said base member for rotation about a fixed center axis and having its periphery inwardly spaced from the entire periphery of said base member, a second circular dial of smaller diameter than said first dial rotatably superimposed in parallel relation upon said first dial for rotation about a center axis common to the center axis of said first dial, and said first dial having an exposed margin between the periphery of said first and second dials, said base member having a first circular number scale fixed thereto concentric to and outwardly adjacent the periphery of said first dial comprising the numbers 1 to 60 arranged in clockwise sequence with the number 60 occupying the top center point of said first number scale and including an index mark in fixed relation to and coinciding with the number 60, said first dial having a second circular number scale fixed thereto within its said exposed margin comprising the numbers 1 to 60 arranged in clockwise sequence and radially aligned with the numbers of said first number scale, and said second dial having a third circular number scale fixed thereto concentric to and inwardly adjacent its periphery comprising the numbers 1 to 60 arranged in counter-clockwise sequence and radially aligned with the numbers of said first and second scales and including an index mark in fixed relation to and coinciding with the number 60.

2. The computer as defined in claim 1, wherein said base member is non-circular and includes a top edge and wherein said index mark of said first number scale is in a top position relatively to said top edge.

3. The computer as defined in claim 1, wherein said base member is rectangular with one edge constituting a top edge and wherein said index mark of said first number scale is in a top position relatively to said top edge.

4. The computer as defined in claim 1, wherein said base member contains identifying indicia having its reading position arranged to orient its top edge to a top position and wherein said index mark of said first number scale is in a top position relatively to said top edge.

5. A computer for the solution of aircraft position problems, comprising a planar base member constituting a fixed reference and having an obverse side and a reverse side, a first circular dial rotatably superimposed in parallel relation upon the obverse side of said base member for rotation about a fixed center axis and having its periphery inwardly spaced from the entire periphery of said base member, a second circular dial of smaller diameter than said first dial rotatably superimposed in parallel relation upon said first dial for rotation about a center axis common to the center axis of said first dial, and said first dial having an exposed margin between the periphery of said first and second dials, said base member having a first circular number scale fixed thereto concentric to and outwardly adjacent the periphery of said first dial comprising the numbers 1 to 60 arranged in clockwise sequence with the number 60 occupying the top center point of said fixed number scale and including an index mark in fixed relation to and coinciding with the number 60, said first dial having a second circular number scale fixed thereto within its said exposed margin comprising the numbers 1 to 60 arranged in clockwise sequence and radially aligned with the numbers of said first number scale, and said second dial having a third circular number scale fixed thereto concentric to and inwardly adjacent its periphery comprising the numbers 1 to 60 arranged in counter-clockwise sequence and radially aligned with the numbers of said first and second scales and including an index mark in fixed relation to and coinciding with the number 60, and a third circular dial rotatably superimposed in parallel relation upon the reverse side of said base member for rotation about a center axis common to the center axes of said first and second dials and having its periphery inwardly spaced from the entire periphery of said base member, said reverse side of said base member and said third dial having cooperative logarithmic scales for solving time-speed-distance problems comprising a circular miles scale upon said reverse side of said base member in adjacent surrounding relation to the periphery of said third dial and a circular time scale upon said third dial adjacent its periphery including an index mark indicating 60 minutes, and said third dial having instruction data in the area surrounded by said time scale including an outer circular band in simulation of said first scale including an index mark identified by the number 60 coinciding with said index mark of said time scale and selected numbers of a hypothetical problem in corresponding position to the same numbers of said first scale, an intermediate circular band in simulation of said second scale including selected numbers of said hypothetical problem in corresponding position to the same numbers of said second scale, and an inner circular band in simulation of said third scale including an index mark identified by the number 60 and selected numbers of said problem in corresponding position to the same numbers of said third scale, all numbers of said first, second and third scales except said selected numbers being omitted in said bands, and said third dial also having in said area surrounded by said time scale explanatory data relating to said hypothetical problem directed to said bands and to said selected numbers whereby, upon arranging said first, second and third scales of said respective base member and said first and second dials in corresponding arrangement to said hypothetical problem, said explanatory data may be read in relation to said first, second and third scales.

References Cited by the Examiner

UNITED STATES PATENTS

| | | | |
|---|---|---|---|
| 1,207,448 | 12/1916 | Venable | 235—88 |
| 2,239,959 | 4/1941 | Gray | 235—78 |
| 2,394,226 | 2/1946 | Baldocchi | 235—78 |
| 2,404,709 | 7/1946 | Hill | 235—78 |
| 2,517,590 | 8/1950 | Mundorff | 235—84 X |
| 2,585,618 | 2/1952 | Batori | 235—84 |
| 2,775,404 | 12/1956 | Lahr | 235—61.02 |

FOREIGN PATENTS 707,740 4/1954 Great Britain.

RICHARD B. WILKINSON, Primary Examiner.

LEO SMILOW, Examiner.

C. G. COVELL, Assistant Examiner.